US006975154B1

(12) United States Patent
Pedersen

(10) Patent No.: US 6,975,154 B1
(45) Date of Patent: Dec. 13, 2005

(54) REDUCED POWER CONSUMPTION CLOCK NETWORK

(75) Inventor: Bruce Pedersen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 10/426,473

(22) Filed: Apr. 29, 2003

(51) Int. Cl.[7] .............................................. H03K 1/04
(52) U.S. Cl. ..................... 327/295; 327/293; 713/320
(58) Field of Search ......................... 327/291, 293–299, 327/403, 407, 415, 99, 544; 713/401, 501, 713/320–324

(56) References Cited

U.S. PATENT DOCUMENTS

| | | | | |
|---|---|---|---|---|
| 5,150,068 A | * | 9/1992 | Kawashima et al. | 327/145 |
| 5,398,262 A | * | 3/1995 | Ahuja | 375/356 |
| 5,479,647 A | * | 12/1995 | Harness et al. | 713/401 |
| 5,696,950 A | * | 12/1997 | Ichinose et al. | 713/501 |
| 5,939,919 A | * | 8/1999 | Proebsting | 327/295 |
| 6,072,348 A | * | 6/2000 | New et al. | 327/295 |
| 6,720,810 B1 | * | 4/2004 | New | 327/158 |

OTHER PUBLICATIONS

R. Hossain et al., "Low Power Design Using Double Edge Triggered Flip-Flops" IEEE Transactions VLSI Systems, vol. 2. No. 2, pp. 261-265, Jun. 1994.
S.H. Unger, "Double-Edge-Triggered Flip-Flops", IEEE Transactions on Computer, vol. c-30, No. 6, pp. 447-451, Jun. 1981.

* cited by examiner

Primary Examiner—Minh Nguyen
(74) Attorney, Agent, or Firm—Townsend and Townsend and Crew LLP

(57) ABSTRACT

An exemplary reduced-power-consumption network includes a frequency divider coupled through global clock lines to a plurality of double-edge triggered registers. Another exemplary network includes a plurality of individually programmable frequency dividers coupled through local clock lines to a plurality of double-edge triggered registers.

25 Claims, 6 Drawing Sheets

REDUCED POWER CONSUMPTION CLOCK NETWORK

BACKGROUND OF THE INVENTION

The present invention relates to clock networks and associated registers for use with programmable logic devices or other similar devices.

Programmable logic devices ("PLDs") (also sometimes referred to as CPLDs, PALs, PLAs, FPLAs, EPLDs, EEPLDs, LCAs, FPGAs, or by other names), are well-known integrated circuits that provide the advantages of fixed integrated circuits with the flexibility of custom integrated circuits. Such devices are well known in the art and typically provide an "off the shelf" device having at least a portion that can be electrically programmed to meet a user's specific needs. Application specific integrated circuits ("ASICs") have traditionally been fixed integrated circuits, however, it is possible to provide an ASIC that has a portion or portions that are programmable; thus, it is possible for an integrated circuit device to have qualities of both an ASIC and a PLD. The term PLD as used herein will be considered broad enough to include such devices.

PLDs typically include blocks of logic elements (i.e. circuits that perform logic functions), sometimes referred to as logic array blocks ("LABs"; also referred to by other names, e.g., "configurable logic blocks," or "CLBs"). The term LAB as used herein will be considered broad enough to refer generally to a grouping of logic circuits. LABs will typically include a plurality of clocked registers such as, e.g., latches or flip-flops, that load and/or output data (i.e. "move" data) in response to a clock signal. A clock distribution network typically exists that distributes one or more clock signals from one or more clock signal sources to the clocked registers on the PLD.

In a typical PLD, each LAB can generate a small number of clock signals from which each of the LAB's logic elements can chose to trigger its associated register on, for example, a rising edge of the clock signal. The LABs generate these clock signals from a general clock signal that is either routed through the general interconnect or through a set of high-speed dedicated clock lines that are global to the device.

Because they typically fan out to every logic element in the device, clock networks can consume considerable power. In general, the power dissipation is proportional to the switching frequency of the clock. Some of this power dissipation occurs in the wiring and driving transistors of the global clock network outside and between the LABs, and some of the power dissipation occurs in the wiring and devices that exist inside each LAB and its associated logic elements.

SUMMARY OF THE INVENTION

One embodiment of the present invention provides a reduced power consumption network including a frequency divider circuit coupled through global distribution lines to a plurality of double-edge triggered registers used in performing functions of an integrated circuit. The exemplary frequency divider circuit is programmable to operate in a bypass mode, a falling edge mode, or a rising edge mode. The frequency divider circuit together with the double-edge triggered registers allow the integrated circuit to be programmed to emulate a device with falling or rising edge triggered registers while still realizing power savings related to distribution of a lower frequency clock signal. In an alternative embodiment, a reduced power consumption network includes a plurality of frequency divider circuits coupled to double-edge triggered registers through clock distribution lines local to each logic array block ("LAB"). The plurality of frequency divider circuits may be individually programmed so that a variety of register characteristics may be emulated. For example, in the particular alternative embodiment illustrated, a first frequency divider may be programmed so that a first LAB with double-edge triggered registers behaves, from the perspective of a global clock signal, like a LAB with rising edge triggered registers and a second frequency divider may be programmed differently so that a second LAB behaves, from the perspective of the global clock signal, like a LAB with falling edge triggered registers.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION OF THE EXEMPLARY EMBODIMENTS

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
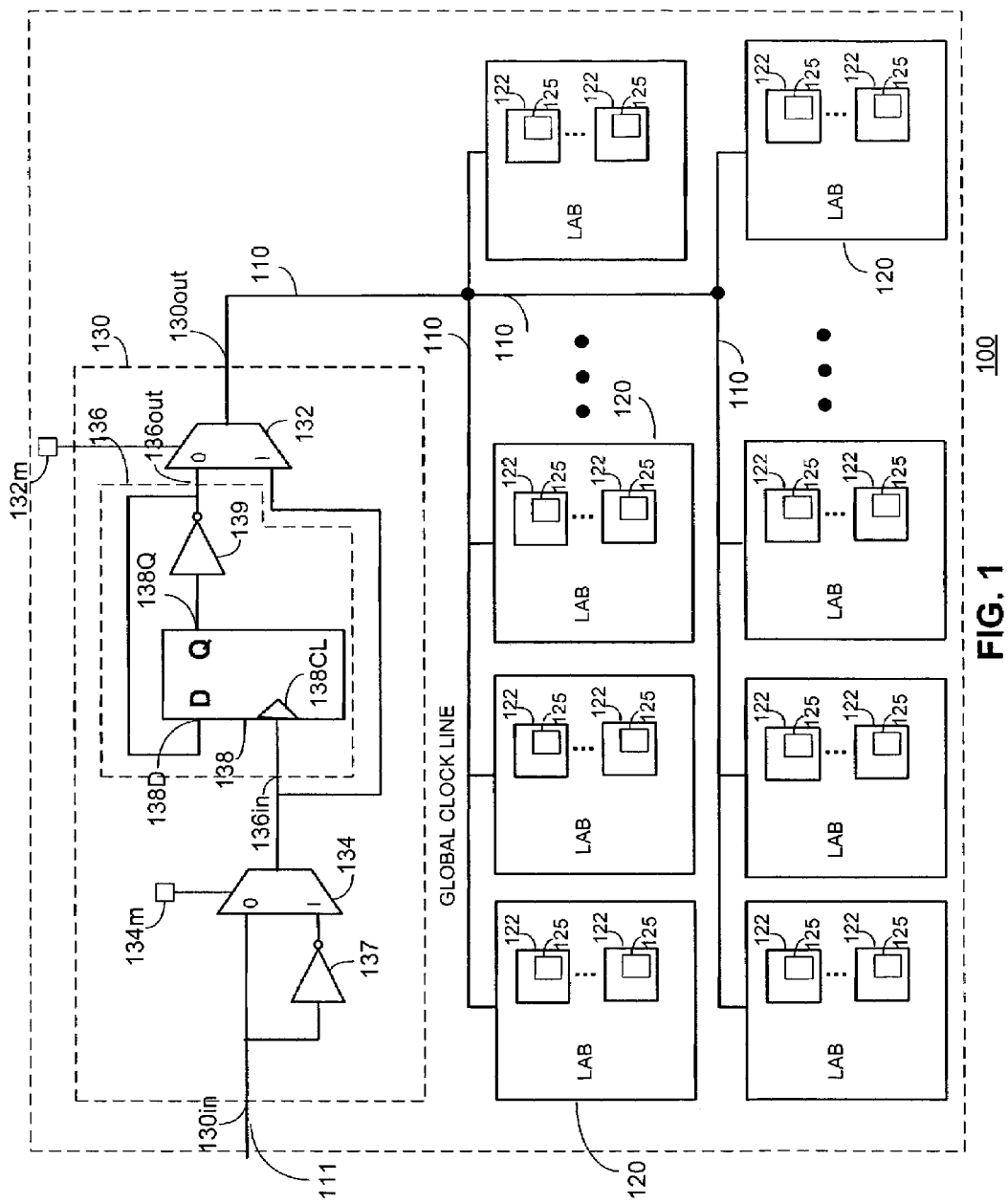
FIG. 1 illustrates a PLD portion in accordance with an embodiment of the present invention.

FIG. 1 illustrates a PLD portion 100 in accordance with an embodiment of the present invention. PLD portion 100 includes frequency divider circuit 130, clock distribution network 110, and a plurality of LABs 120. Each LAB 120 includes a plurality of logic elements 122 and each logic element includes one or more registers 125. Registers 125 are double-edge triggered registers and are shown and described further in the context of FIG. 2 and accompanying text.

Continuing with FIG. 1, a first clock signal on line 111 is received by frequency divider 130 which outputs a second clock signal to clock signal distribution network 110 which in turn makes the second clock signal available to LABs 120 for use by registers 125 of logic elements 122. Exemplary frequency divider 130 comprises input 130 in, multiplexors ("muxes") 134 and 132, inverter 137, toggle register 138, and output 130 out, all coupled as shown. Toggle register 136 includes input 136 in, flip-flop 138 (which includes inputs 138D and 138CL and output 138Q), inverter 139, and output 136 out, all coupled as shown. Frequency divider 130 may be programmed to operate in a bypass mode by programming mux 132 to select its second input (labeled "1"). In bypass mode, the second clock signal provided to clock network 110 has the same frequency as the first clock signal received on line 111. Furthermore, the second clock signal is either the same as the first clock signal (if mux 134's first input—labeled "0"—is selected), or is inverted relative to the first clock signal (if mux 134's second input—labeled "1"—is selected). Inverting the second clock signal relative to the first clock signal in bypass mode does not affect results because registers 125 are double-edge triggered (i.e., because the registers are triggered whether the clock transition is low-to-high or high-to-low, an inverted signal has the same effect as a non-inverted signal). In bypass mode, because registers 125 are double-edge triggered, the first clock signal can be half the frequency that it would otherwise need to be to accomplish the same processing speeds if such registers were only single edge (either rising or falling edge) triggered.

However, it may be inconvenient for a PLD user to utilize a half-frequency clock signal to be provided on line 111. For example, the PLD of which PLD portion 100 is a part may be coupled to other devices that rely on single-edge triggered registers. The user may be accustomed to implementing designs based on devices with single-edge triggered devices. In such instances, frequency divider 130 may be used so that PLD portion 100 emulates a PLD portion with single-edge triggered registers even though registers 125 are double-edge triggered. Furthermore, frequency divider 130 provides PLD portion 100 with the ability to emulate either rising-edge or falling-edge triggered registers. For example, if mux 134 is programmed to select its first input (labeled "0") and mux 132 is programmed to select its first input (labeled "0"), then the second clock signal provided to distribution network 110 will have half the frequency of the first signal and will have rising and falling edges that correspond to the rising edges of the first clock signal. If mux 134 is programmed to select its second input (labeled "1") and mux 132 is programmed to select its first input (labeled "0"), then the second clock signal provided to distribution network 110 will have half the frequency of the first signal but will have rising and falling edges that correspond to the falling edges of the first clock signal. In this manner, frequency divider 130 may be programmed so that PLD portion 100 selectively emulates a device with either rising edge triggered registers or falling edge triggered registers even though in fact registers 125 are double-edge triggered. In either case the user provides a first clock signal to PLD portion 100 that is twice the frequency of a second clock signal actually distributed throughout the device by clock signal network 110. The power dissipation benefits of a reduced frequency clock signal are thus achieved even though the user is relying on a first clock signal having a higher frequency.

Programming of muxes 134 and 132 is accomplished by loading respective bits in configuration memory elements 134m and 132m which are coupled to control inputs of muxes 134 and 132 as shown. In a typical PLD example, configuration elements such as elements 134m and 132m will be random access memory bits that can be reconfigured in the field by loading them with new data. However, a variety of configurable elements and programming methods may be used. Some examples may include static or dynamic random access memory, electrically erasable read-only memory, flash, fuse, and anti-fuse programmable connections. The programming of configuration elements could also be implemented through mask programming during fabrication of the device. While mask programming may have disadvantages relative to some of the field programmable options already listed, it may be useful in certain high volume applications. For purposes herein, the terms "programmable" and "programming" in the context of circuits will be understood as broad enough to include these and other examples.

Figure 2:
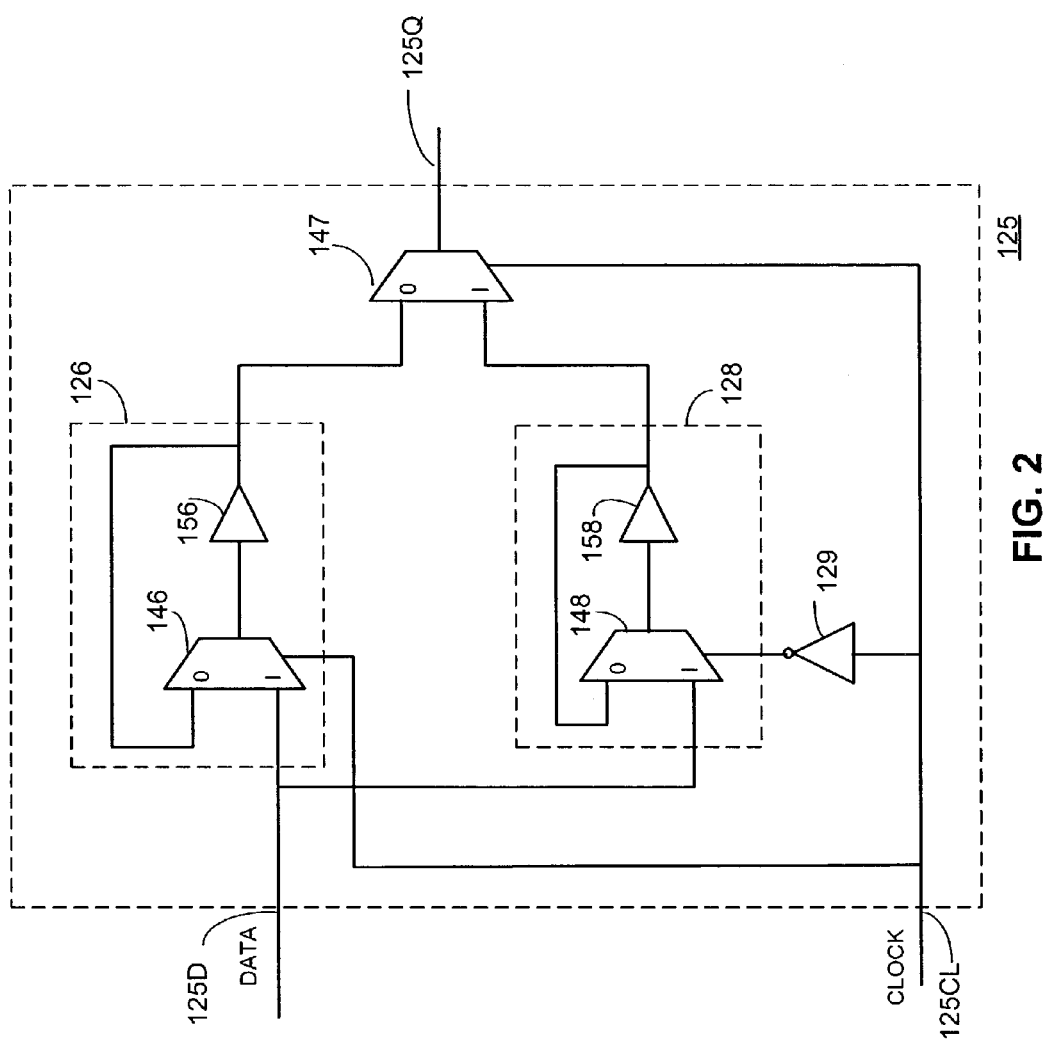
FIG. 2 show further details of a double-edge triggered register of the PLD portion illustrated in FIG. 1.

FIG. 2 show further details of an exemplary double-edge triggered register 125 of the PLD portion 100 illustrated in FIG. 1. Double-edge triggered register 125 includes latches 126 (including mux 146 and buffer 156 coupled as shown) and 128 (including mux 148 and buffer 158 coupled as shown), inverter 129, and mux 147 all coupled together as shown and coupled to clock input 125CL, data input 125D, and data output 125Q. When a clock signal provided at clock input 125CL transitions to high, a high value is then provided to the control input of mux 146, a low value is provided to the control input of mux 148 (inverted due to inverter 129), and a high value is provided to the control input of mux 147. This causes mux 146 to select its second input (labeled "1"), mux 148 to select its first input (labeled "0"), and mux 147 to select its second input (labeled "1"). Thus, the value at data input 125D (e.g. low or high, binary "0" or "1") is loaded by latch 126, and the value presently output by latch 128 is provided to data output 125Q. When the clock signal at clock input 125CL transitions from high to low, a low value is then provided to the control input of mux 146, a high value is provided to the control input of mux 148 (inverted due to inverter 129), and a low value is provided to the control input of mux 147. This causes mux 146 to select its first input (labeled "0"), mux 148 to select its second input (labeled "1"), and mux 147 to select its first input (labeled "0"). Thus, the value presently at data input 125D is loaded by latch 128 and the value presently output by latch 126 (which had been loaded on the preceding rising edge as just described) is provided at data output 125Q. In this manner, data moves through register 125 on both the rising and falling edges of a clock signal provided at input 125CL. This movement of data with corresponding clock signal edges is further described in the context of the timing diagrams of FIGS. 3a–3i.

Figure 3:
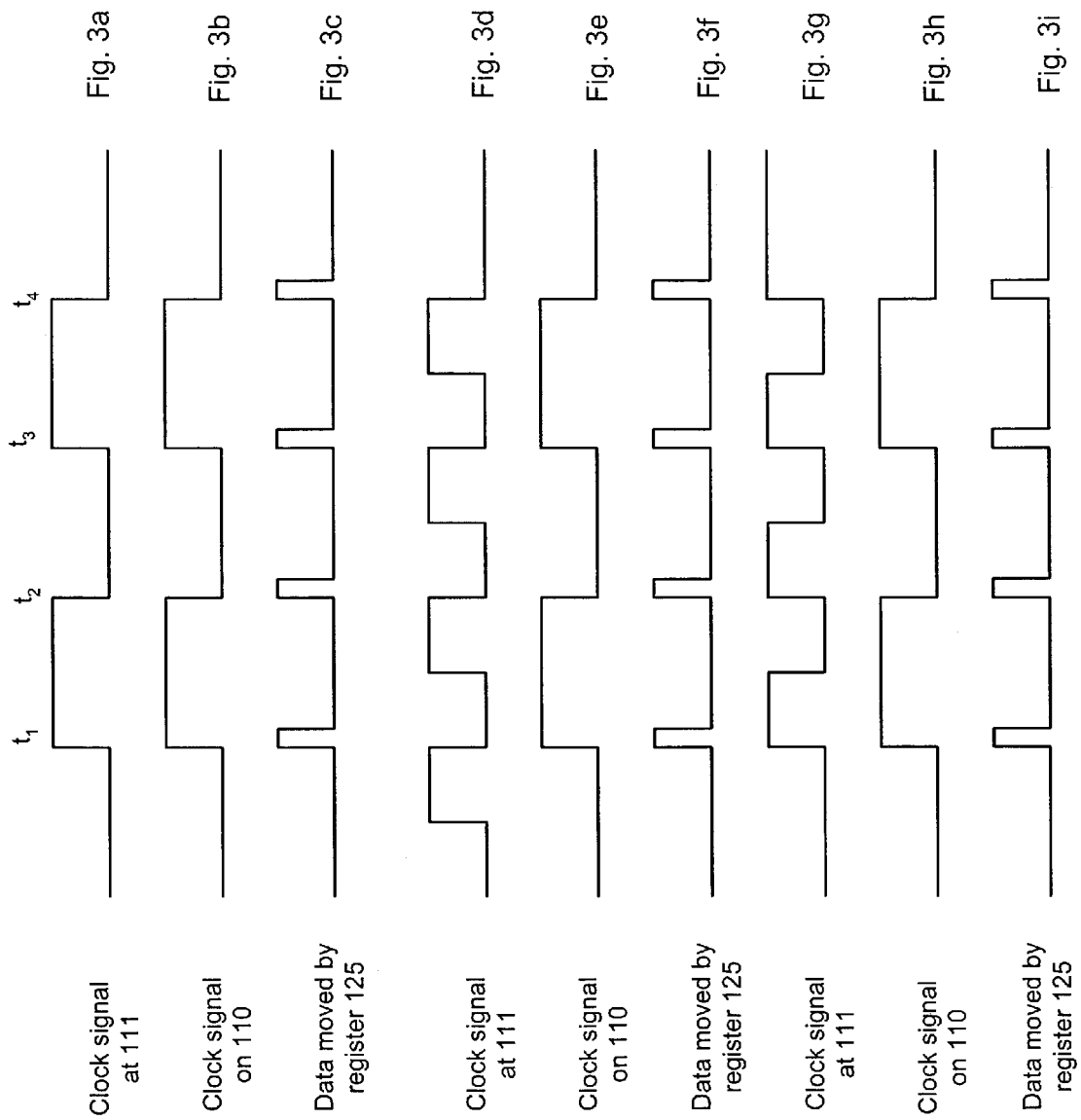
FIGS. 3a–3c are timing diagrams illustrating first and second clock signals triggering data movement when a frequency divider of the PLD portion illustrated in FIG. 1 is programmed to operate in a "bypass mode."
FIGS. 3d–3f are timing diagrams illustrating first and second clock signals triggering data movement when a frequency divider of the PLD portion illustrated in FIG. 1 is programmed to operate in a "falling edge mode."
FIGS. 3g–3i are timing diagrams illustrating first and second clock signals triggering data movement when a frequency divider of the PLD portion illustrated in FIG. 1 is programmed to operate in a "rising edge mode."

FIGS. 3a–3c are timing diagrams illustrating the relationship between a first clock signal presented to frequency divider 130 (illustrated in FIG. 1) on line 111, a second clock signal provided by frequency divider 130, and the movement of data through registers 125 if the circuitry is programmed to operate in a "bypass mode." In this example, the clock signal provided on line 111 (FIG. 3a) has the same frequency and phase (i.e., for practical purposes is the same as) the clock signal provided to distribution network 110 (FIG. 3b). However, as discussed above in relation to FIG.

2, a "bypass mode" may be effectively implemented even if the second signal is an inverted version of the first signal (i.e. same frequency but a half cycle out of phase) because registers 125 are double-edge triggered (i.e., a low-to-high transition has effectively the same impact on triggering data movement as does a high-to-low transition). FIG. 3c illustrates the time points at which registers 125 are triggered to move data based upon the clock signal received through clock network 110 (FIG. 3b). As will be appreciated by those skilled in the art, the diagram in FIG. 3c (and the diagrams in FIGS. 3f and 3i) does not represent an actual signal transmitted on the device. Rather, the diagram of FIG. 3c simply illustrates that registers 125 load and provide data when the clock signal of FIG. 3b transitions from one value (low or high) to another value (high or low). In this diagram, such transitions are shown at times t1, t2, t3, and t4.

FIGS. 3d–3f are timing diagrams illustrating the relationship between a first clock signal presented to frequency divider 130 on line 111, a second clock signal provided by frequency divider 130, and the movement of data through registers 125 if the circuitry is programmed to operate in a "falling edge mode" (i.e. a mode in which a device having falling edge triggered registers will be emulated). In this example, the clock signal provided to distribution network 110 (FIG. 3e) by frequency divider 130 has half the frequency of the clock signal provided on line 111 (FIG. 3d). In this example, frequency divider 130 is programmed (as described above in relation to FIG. 2) to provide a clock signal to distribution network 110 (FIG. 3e) that transitions (either from low to high or from high to low) on each falling edge of the clock signal provided on line 111 (FIG. 3d). In this example, those transitions occur at times t1, t2, t3, and t4 as shown. FIG. 3f illustrates the time points at which registers 125 are triggered to move data based upon the clock signal received through clock network 110 (FIG. 3e). Such transitions are shown at times t1, t2, t3, and t4.

FIGS. 3g–3i are timing diagrams illustrating the relationship between a first clock signal presented to frequency divider 130 on line 111, a second clock signal provided by frequency divider 130, and the movement of data through registers 125 if the circuitry is programmed to operate in a "rising edge mode" (i.e. a mode in which a device having rising edge triggered registers will be emulated). In this example, the clock signal provided to distribution network 110 (FIG. 3h) by frequency divider 130 has half the frequency of the clock signal provided on line 111 (FIG. 3g). In this example, frequency divider 130 is programmed (as described above in relation to FIG. 2) to provide a clock signal to distribution network 110 (FIG. 3h) that transitions (either from low to high or from high to low) on each rising edge of the clock signal provided on line 111 (FIG. 3g). In this example, those transitions occur at times t1, t2, t3, and t4 as shown. FIG. 3i illustrates the time points at which registers 125 are triggered to move data based upon the clock signal received through clock network 110 (FIG. 3h). Such transitions are shown at times t1, t2, t3, and t4.

Figure 4:
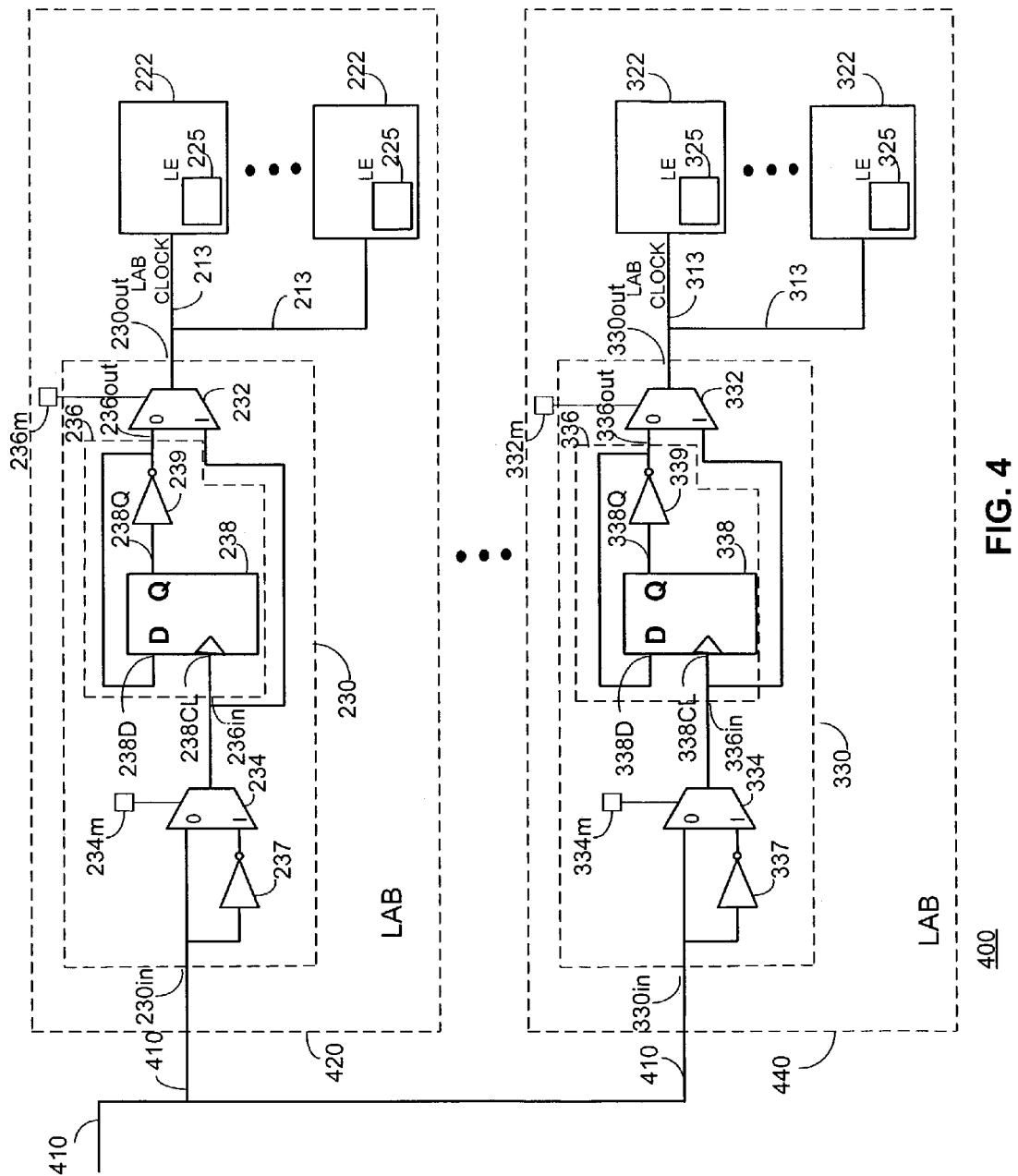
FIG. 4 illustrates a PLD portion in accordance with an alternative embodiment of the present invention.

FIG. 4 illustrates a PLD portion 400 in accordance with an alternative embodiment of the present invention. In PLD portion 400, frequency divider circuits are provided local to the PLD portion's LABs. PLD portion 400 includes a clock distribution network 410 and a plurality of LABs including LAB 420 and LAB 440. LABs 420 and 440 include respective frequency dividers 230 and 330 as shown. Frequency dividers 230 and 330 receive a first clock signal through clock distribution lines 410 and respectively provide respective second clock signals local to their respective labs on respective lines 213 and 313 as shown. LAB 230's clock lines 213 distribute a second clock signal to double-edge triggered registers 225 of logic elements 222 and LAB 330's clock lines 313 distribute another second clock signal to double-edge triggered registers 325 of logic elements 322 as shown.

Frequency divider 230 comprises input 230 in, muxes 234 and 232, inverter 237, toggle register 238, and output 230 out, all coupled as shown. Toggle register 236 includes input 236 in, flip-flop 238 (which includes inputs 238D and 238CL and output 138Q), inverter 239, and output 236 out, all coupled as shown. Frequency divider 230 may be programmed to operate in a bypass mode by programming mux 232 to select its second input (labeled "1"). Frequency divider 330 comprises input 330 in, muxes 334 and 332, inverter 337, toggle register 338, and output 330 out, all coupled as shown. Toggle register 336 includes input 336 in, flip-flop 338 (which includes inputs 338D and 338CL and output 338Q), inverter 339, and output 336 out, all coupled as shown. Frequency divider 330 may be programmed to operate in a bypass mode by programming mux 332 to select its second input (labeled "1").

The architecture illustrated in FIG. 4 allows for different second clock signals to be provided in each LAB to allow emulation of LABs with different types of registers from LAB to LAB even if the registers from LAB to LAB are in fact the same type (i.e. double-edge triggered). For example, if mux 234 is programmed to select its first input (labeled "0") and mux 232 is programmed to select its first input (labeled "0"), then the second clock signal provided to lines 213 of LAB 420 will have half the frequency of a global clock signal provided clock distribution network 410 and will have rising and falling edges that correspond to the rising edges of the global clock signal clock signal. Thus, although registers 225 are double-edge triggered, LAB 230 will, from the perspective of a clock signal distributed on lines 410, emulate a LAB with rising-edge triggered registers. At the same time, if mux 334 is programmed to select its second input (labeled "1") and mux 332 is programmed to select its first input (labeled "0"), then the second clock signal provided to lines 313 of LAB 440 will also have half the frequency of the global clock signal received from clock distribution network 410, but will have rising and falling edges that correspond to the falling edges of the global clock signal. Thus, although registers 325 are double-edge triggered, LAB 330 will, from the perspective of a clock signal distributed on lines 410, emulate a LAB with falling-edge triggered registers. This particular example is further illustrated and described in the timing diagrams of FIGS. 5a–5e and accompanying text.

Programming of muxes 234, 232, 334, and 332 is accomplished by loading respective bits in configuration memory elements 234m, 232m, 334m, and 332m which are coupled to control inputs of muxes 234, 232, 334, and 332 as shown.

Figure 5:
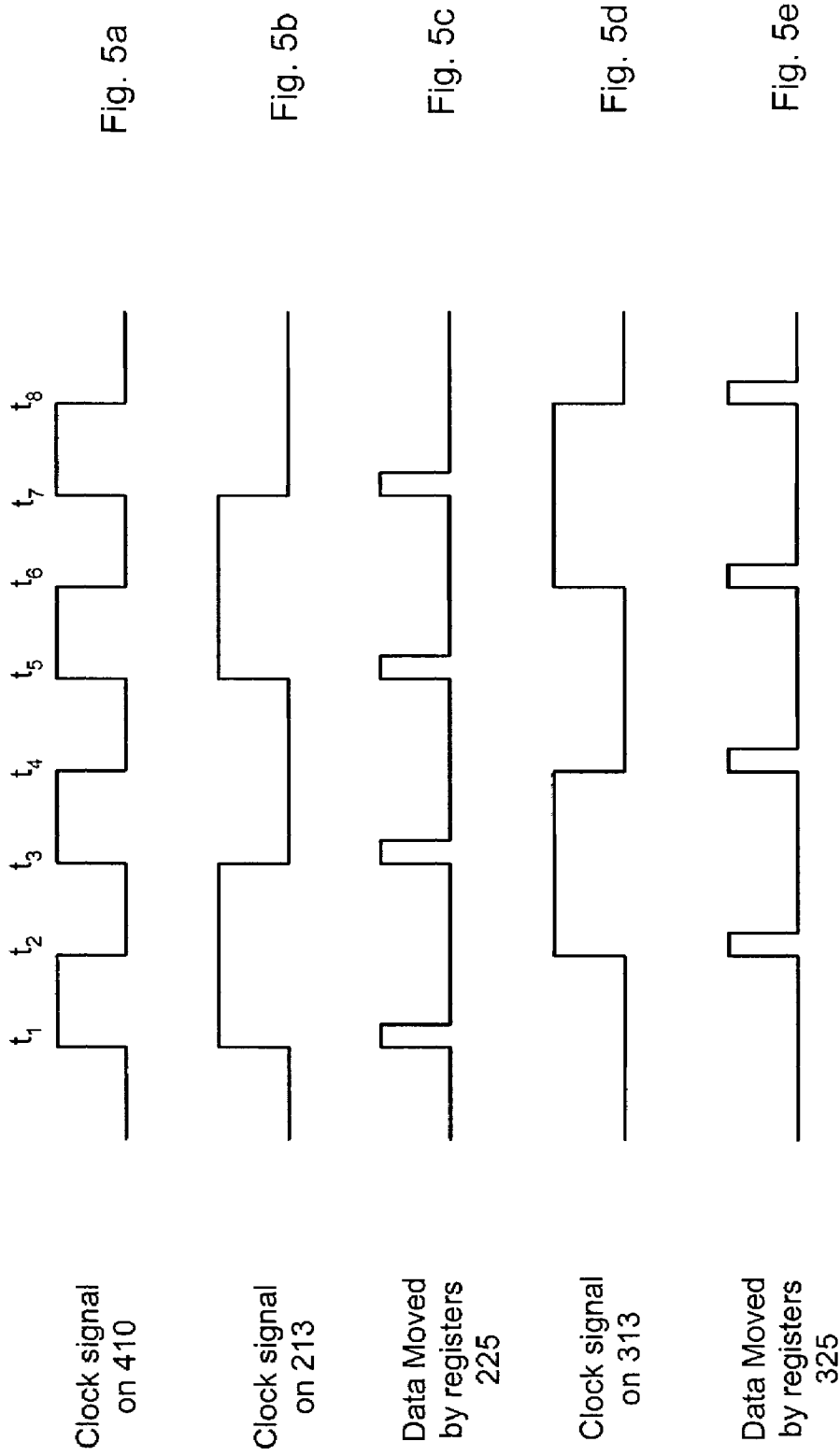
FIGS. 5a–5e are timing diagrams illustrating a first clock signal, and a plurality of second clock signals triggering data movement when frequency dividers of the PLD portion illustrated in FIG. 4 are individually programmed.

FIGS. 5a–5e are timing diagrams illustrating the relationship between a first clock signal distributed by clock distribution network 410 of LAB portion 400 (of the embodiment of FIG. 4), second clock signals that are provided by frequency dividers local to each LAB, and the movement of data through the registers coupled to the LEs of each LAB. In particular, FIG. 5a illustrates a clock signal provided on distribution network 410 that is global to PLD portion 400. Frequency divider 230 receives the signal of FIG. 5a and provides a second clock signal on lines 213 as illustrated in FIG. 5b. In this example, the clock signal provided to lines 213 (FIG. 5b) by frequency divider 230 has half the frequency of the clock signal provided on global clock lines 410 (FIG. 5a). In this example, frequency divider 230 is programmed (as described above in relation to FIG. 4) to provide a clock signal to local distribution lines 213 (FIG. 5b) that transitions (either from low to high or from high to low) on each rising edge of the clock signal provided on lines 410 (FIG. 5a). In this example, those transitions occur at times t1, t3, t5, and t7 as shown. FIG. 5c illustrates the time points at which registers 225 are triggered to move data based upon the clock signal received through clock lines 213 (FIG. 5b). As shown in FIG. 5c, such triggering occurs at times t1, t3, t5, and t7. Thus, the programming of frequency divider 230 (as previously described) allows LAB 420 to effectively emulate, from the perspective of the clock signal provided on distribution network 410, a LAB with rising edge triggered registers even though registers 225 are in fact double-edge triggered.

Continuing with the present example, the clock signal provided to lines 313 (FIG. 5d) by frequency divider 330 has half the frequency of the clock signal provided on global clock lines 410 (FIG. 5a). In this example, frequency divider 330 is programmed (as described above in relation to FIG. 4) to provide a clock signal to local distribution lines 313 (FIG. 5d) that transitions (either from low to high or from high to low) on each falling edge of the clock signal provided on lines 410 (FIG. 5a). In this example, those transitions occur at times t2, t4, t6, and t8 as shown. FIG. 5e illustrates the time points at which registers 325 are triggered to move data based upon the clock signal received through clock lines 313 (FIG. 5d). As shown in FIG. 5e, such triggering occurs at times t2, t4, t6, and t8. Thus, the programming of frequency divider 330 (as previously described) allows LAB 440 to effectively emulate, from the perspective of the clock signal provided on distribution network 410, a LAB with falling edge triggered registers even though registers 325 are in fact double-edge triggered.

Figure 6:
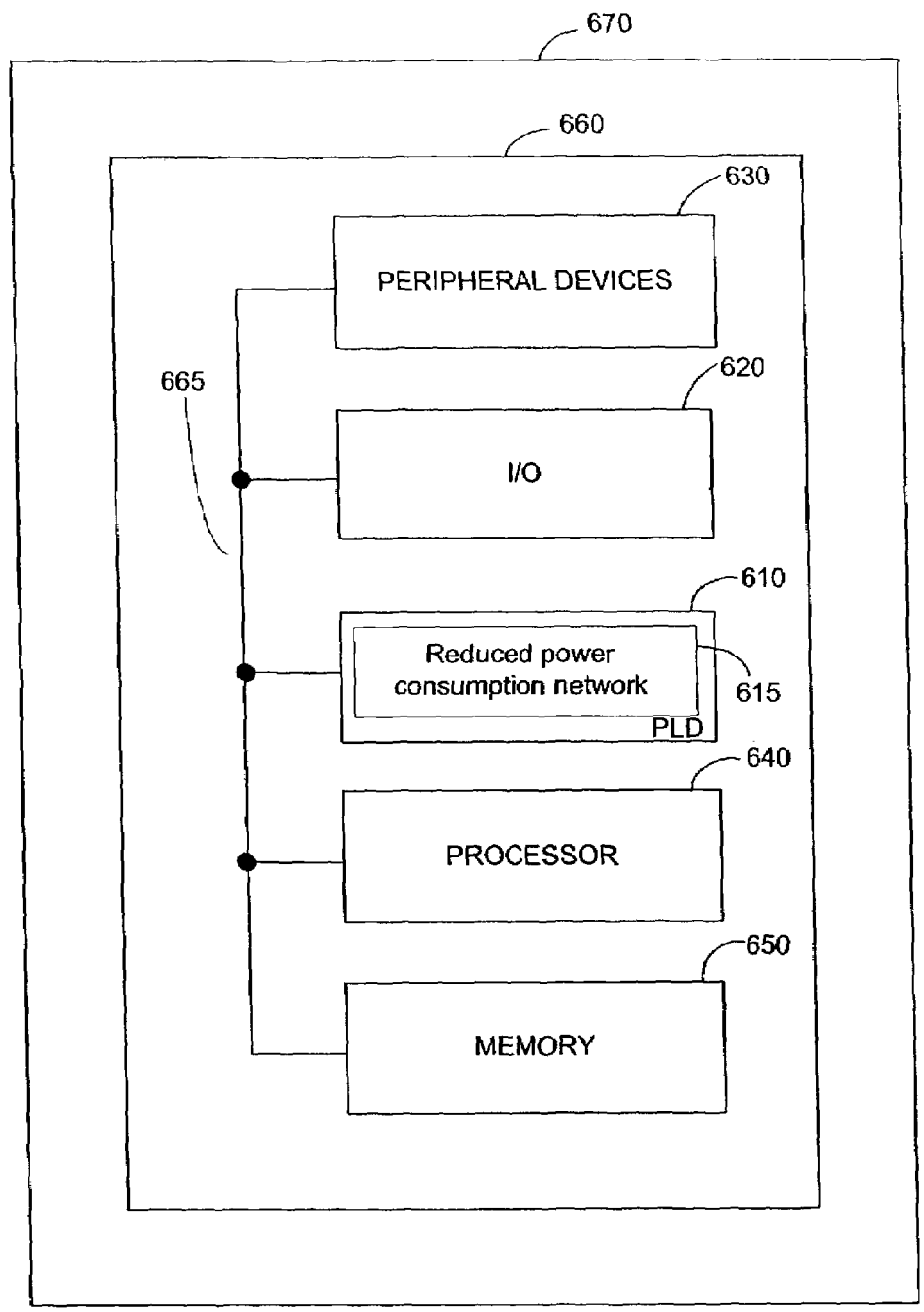
FIG. 6 illustrates an exemplary data processing system including an exemplary programmable logic device in which a reduced power consumption network in accordance with the present invention might be implemented.

FIG. 6 illustrates a programmable logic device (PLD) 610 in a data processing system 600. As one example, a reduced power consumption network 615 in accordance with the present invention may be implemented in a PLD such as PLD 610. Data processing system 600 may include one or more of the following components: a processor 640; memory 650; I/O circuitry 620; and peripheral devices 630. These components are coupled together by a system bus 665 and are populated on a circuit board 660 which is contained in an end-user system 670. A data processing system such as system 600 may include a single end-user system such as end-user system 670 or may include a plurality of systems working together as a data processing system.

System 600 can be used in a wide variety of applications, such as computer networking, data networking, instrumentation, video processing, digital signal processing, or any other application where the advantage of using programmable or reprogrammable logic is desirable. PLD 610 can be used to perform a variety of different logic functions. For example, programmable logic device 610 can be configured as a processor or controller that works in cooperation with processor 640 (or, in alternative embodiments, a PLD might itself act as the sole system processor). PLD 610 may also be used as an arbiter for arbitrating access to a shared resources in system 600. In yet another example, PLD 610 can be configured as an interface between processor 640 and one of the other components in system 600. It should be noted that system 600 is only exemplary.

Although particular embodiments have been described in detail, various modifications to the embodiments described herein may be made without departing from the spirit and scope of the present invention, thus, the invention is limited only by the appended claims.

What is claimed is:

1. In an integrated circuit device, a reduced power consumption network comprising:
   a frequency divider circuit coupled to receive a first clock signal from a clock signal source and coupled to provide a second clock signal;
   a clock signal distribution network coupled to receive the second clock signal from the frequency divider circuit; and
   a plurality of double-edge triggered registers to help perform clocked functions of the integrated circuit, the plurality of double-edge triggered registers being coupled to the clock signal distribution network to receive the second clock signal, wherein
   the frequency divider circuit is programmable to selectively provide the second clock signal such that the second clock signal transitions on either a rising or a falling edge of the first clock signal depending upon programming of the frequency divider circuit.

2. The reduced power consumption network of claim 1 wherein the frequency divider circuit is programmable to be selectively bypassed such that, in a bypass mode, the second clock signal is the first clock signal or an inverted version of the first clock signal, and, in a non-bypass mode, the second clock signal has a frequency equal to one half of a frequency of the first clock signal.

3. A programmable logic device comprising the reduced power consumption network of claim 2.

4. A programmable logic device comprising the reduced power consumption network of claim 1.

5. A data processing system comprising the programmable logic device of claim 4.

6. In an integrated circuit device, a reduced power consumption network comprising:
   a frequency divider circuit coupled to receive a first clock signal from a clock signal source and coupled to provide a second clock signal, the frequency divider circuit comprising
      a frequency divider input coupled to receive the first clock signal,
      a first inverter,
      a first multiplexor ("mux"),
      a toggle register,
      a second mux, and
      a frequency divider output;
   a clock signal distribution network coupled to receive the second clock signal from the frequency divider circuit; and
   a plurality of double-edge triggered registers to help perform clocked functions of the integrated circuit, the plurality of double-edge triggered registers being coupled to the clock signal distribution network to receive the second clock signal, wherein
   the frequency divider input is coupled to an input of the first inverter and to an input of the first mux;
   an output of the first inverter is coupled to another input of the first mux;
   an output of the first mux is coupled to an input of the toggle register and to an input of the second mux;
   an output of the toggle register is coupled to another input of the second mux; and
   an output of the second mux is coupled to the frequency divider output to provide the second clock signal to the clock signal distribution network.

7. The reduced power consumption network of claim 6 wherein the frequency divider circuit is programmable to be selectively bypassed such that, in a bypass mode, the second clock signal is the first clock signal or an inverted version of the first clock signal, and, in a non-bypass mode, the second clock signal has a frequency equal to one half of a frequency of the first clock signal, activation of bypass or non-bypass mode depending upon programming of at least the second mux.

8. The reduced power consumption network of claim 6 wherein the frequency divider circuit is programmable to selectively provide the second clock signal such that the second clock signal transitions on either a rising or a falling edge of the first clock sigal depending upon programming of the programming of the first and second muxes, each of the first and second muxes being programmable to select one or another of its inputs.

9. A programmable logic device comprising the reduced power consumption network of claim 6.

10. A reduced power consumption network comprising:
a frequency divider means for receiving a first clock signal and providing a second clock signal;
clock signal distribution means coupled to the frequency divider means for receiving the second clock signal;
a plurality of register means coupled to the clock signal distribution means for loading data on transitions of the second clock signal; and
means for programming the frequency divider means so that the second clock signal is selectively provided to transition on either a rising or a falling edge of the first clock signal depending upon program of the frequency divider means.

11. The reduced power consumption network of claim 10 further comprising means for programming the frequency divider means to be selectively bypassed such that, in a bypass mode, the second clock signal is the first clock signal or an inverted version of the first clock signal, and, in a non-bypass mode, the second clock signal has a frequency equal to one half of a frequency of the first clock signal.

12. A method of reducing power consumption in an integrated circuit comprising:
receiving a first clock signal and providing a second clock signal that has reduced frequency relative to the first clock signal wherein the second clock signal selectively transitions on either a rising edge or a falling edge of the first clock signal depending upon programming of a frequency divider circuit;
distributing the second clock signal to a plurality of registers; and
triggering the registers on transitions of the second clock signal.

13. In an integrated circuit device, a reduced power consumption network comprising:
global clock distribution lines coupled to receive a first clock signal from a clock signal source;
a plurality of frequency divide circuits coupled to receive the fit clock signal from the global clock distribution lines and coupled to provide a plurality of second clock signals to local clock lines coupled to logic array blocks ("LABs") of the integrated circuit; and
a plurality of double-edge triggered registers coupled to the LABs to help perform clocked functions of the integrated circuit, the plurality of double-edge triggered registers being coupled to the local clock lines to receive one of the plurality of second clock signals, wherein the frequency divider circuits are programmable to selectively provide the second clock signals so that each of the second clock signals transitions on either a rising or a falling edge of the first clock sigal depending upon programming of the frequency divider circuits.

14. The reduced power consumption network of claim 13 wherein the frequency divider circuits are individually programmable such that a first frequency divider circuit is programmed to provide a second clock signal through first local lines coupled to a first LAB that transitions on a falling edge of the first clock signal and a second frequency divider circuit is programmed to provide another second clock signal through second local lines coupled to a second LAB that transitions on a rising edge of the first clock signal.

15. A programmable logic device comprising the reduced power consumption network of claim 14.

16. The reduced power consumption work of claim 13 wherein the plurality of frequency divider circuits each comprise;
a frequency divider input coupled to receive the first clock signal from the global clock distribution lines;
a first inverter;
a first multiplexor ("mux");
a register;
a second inverter;
a second mux; and
a frequency divider output;
wherein:
the frequency divider input is coupled to an input of the first inverter and to an input of the first mux;
an output of the first inverter is coupled to another input of the first mux;
an output of the first mux is coupled to an input of the toggle register and to an input of the second mux;
an output of the toggle register is coupled to another input of the second mux; and
an output of the second mux is coupled to the frequency divider output to provide a second clock signal to local clock lines coupled to a LAB.

17. The power reduction network of claim 16 wherein whether one of the plurality of frequency divider circuits provides a second clock signal that transitions on a rising or falling edge of the first clock signal depends upon programming of the first and second muxes of the one of the plurality of frequency divider circuits, each of the first and second muxes being programmable to select one or another of its inputs.

18. A programmable logic device comprising the reduced power consumption network of claim 13.

19. A data processing system comprising the programmable logic device of claim 18.

20. A reduced power consumption network comprising:
a plurality of frequency divider means for receiving a first clock signal and providing a plurality of second clock signals to logic array blocks ("LABs") of an intergrated circuit;
a plurality of register means coupled to the LABs for loading data on transitions of the second clock signal; and
means for individually programming each of the frequency divider means so that each of the second clock signals selectively transitions on either a rising or a falling edge of the first clock signal depending upon individual programming of the frequency divider means.

21. A method of reducing power consumption in an integrated circuit comprising:
receiving a first clock signal and providing a plurality of second clock signals have reduced frequency relative to the first clock signal, wherein each of the second clock signals selectively transitions on either a rising edge or a falling edge of the first clock signal depending upon programming of a frequency divider circuit;

distributing the second clock signals to respective pluralities of registers; and triggering the respective pluralities of registers on transitions of the second clock signals.

22. The method of reducing power consumption of claim 21 wherein:

at least one of the respective second clock signals triggers at least one of the respective pluralities of registers on a rising edge of the first clock signal; and at least one other of the respective second clock signals triggers at least one other of the respective pluralities of registers on a falling edge of the first clock signal.

23. In an integrated circuit device, a reduced power consumption network comprising:

a frequency divider system coupled to receive a first clock signal from a clock signal source and coupled to provide one or more second clock signals;

a clock signal distribution network coupled to receive the one or more second clock signals from the frequency divider system; and a plurality of double-edge trigger registers to help perform clocked functions of the integrated circuit, the plurality of double-edge triggered registers being coupled to the clock signal distribution network to receive the one or more second clock signals, wherein the frequency divider system is programmable to selectively provide the one or more second clock signals so that each of the one or more second clock signals transitions on either a rising or a falling edge of the first clock signal depending upon programming of the frequency divider system.

24. The reduced power consumption network of claim 23, wherein the frequency divider system includes one or more frequency divider circuits that receive the first clock signal and respectively provide the one or more second clock signals.

25. A method of reducing power consumption in an integrated circuit comprising:

receiving a first clock signal and providing one or more second clock signals that have reduced frequencies relative to the first clock signal, wherein each of the one or more second clock signals selectively transitions on either a rising edge or a falling edge of the first clock signal depending upon programming of a frequency divider circuit;

distributing the one or more second clock signals to a plurality of registers; and triggering the registers on transitions of the one or more second clock signals.

* * * * *

UNITED STATES PATENT AND TRADEMARK OFFICE
CERTIFICATE OF CORRECTION

PATENT NO. : 6,975,154 B1  Page 1 of 1
DATED : December 13, 2005
INVENTOR(S) : Bruce Pederson It is certified that error appears in the above-identified patent and that said Letters Patent is hereby corrected as shown below:

Column 9,
Line 29, replace "program" with -- programming --.
Line 56, replace "fit" with -- first --.

Signed and Sealed this

Ninth Day of May, 2006

JON W. DUDAS
*Director of the United States Patent and Trademark Office*